United States Patent [19]
Lavoie et al.

[11] Patent Number: 4,930,617
[45] Date of Patent: Jun. 5, 1990

[54] CURVED CONVEYOR
[75] Inventors: Michel Lavoie; Gaétan Gendron, both of St. Césaire, Canada
[73] Assignee: Machinerie Ideale Cie Ltee, St. Césaire, Canada
[21] Appl. No.: 396,670
[22] Filed: Aug. 22, 1989
[51] Int. Cl.⁵ .............................................. B65G 17/46
[52] U.S. Cl. ................................... 198/692; 198/733; 198/831; 198/841; 198/735.3
[58] Field of Search ............... 198/692, 693, 729, 733, 198/735, 831, 841

[56] References Cited
U.S. PATENT DOCUMENTS

| | | | |
|---|---|---|---|
| 2,652,143 | 9/1953 | Van Doren | 198/831 |
| 2,889,914 | 6/1959 | Anderson et al. | 198/692 |
| 3,155,226 | 11/1964 | Beiler | 198/831 |
| 3,381,800 | 5/1968 | Everett et al. | 198/735 |
| 3,511,360 | 5/1970 | Jagiel | 198/735 |
| 3,595,374 | 7/1971 | Whitfield | 198/733 |
| 4,353,276 | 10/1982 | Ackerfeldt | 198/692 |
| 4,556,143 | 12/1985 | Johnson | 198/841 |

Primary Examiner—Joseph E. Valenza
Attorney, Agent, or Firm—Foley & Lardner, Schwartz, Jeffery, Schwaab, Mack, Blumenthal & Evans

[57] ABSTRACT

A conveyor is disclosed which serves for transporting bales of hay or the like material in a curve. It is made up of a frame, having a bale-receiving and a bale-discharging end; of an endless link chain extending between the frame ends and following the conveyor curve, and of an upright shoulder plate, mounted on the frame between its ends. This plate follows the chain on the chain side facing inwardly of the curve and is provided, on one face, with a plastic chain support for carrying the chain. This chain support is formed with a pair of parallel grooves longitudinally extending between the frame ends. Each groove has an opening on the side of the support facing away from the shoulder plate. These grooves are configured and spaced from one another for slidably supporting the chain strands between the frame ends. The strands are fitted into the grooves and protrude partly out through their openings. Finally, bale-driving spikes are fixed to the chain, outwardly of the grooves, to carry the bales from the receiving to the discharging ends of the conveyor.

15 Claims, 3 Drawing Sheets

CURVED CONVEYOR

BACKGROUND OF THE INVENTION

1. Field of the Invention

The present invention relates to an angular curved link chain conveyor for transferring bales of hay or the like fodder material from one straight conveyor to another; the curvature being usually 90°.

2. Description of the Prior Art

In one particular instance, the bales are moved up from the ground to the storing granary of a barn by means of a straight and inclined conveying elevator. Once in the barn, the bales are picked up by hand and transferred onto another straight conveyor usually at an angle of 90° with the inclined conveying elevator. This bale handling is of course quite a chore especially during the hot hay harvest time. To avoid this tiresome task, many curved conveyors have been perfected. A search in this regard has been made by the applicants, prior to the filing of the present application, and has revealed the following patents:

CANADA No. 724,489
U.K. No. 981,819
U.S. Pat. No. 1.209,021
U.S. Pat. No. 2,785,810
U.S. Pat. No. 2,889,914
U.S. Pat. No. 4,241,822
U.S. Pat. No. 4,538,949

The only patent which was found of interest by the present applicants in regard to their invention is Canadian patent No. 724,489. This patent relates to a curved chain conveyor for transporting bales of hay wherein a central endless link chain, travelling in a curved path, carries a series of bale-supporting transverse bars spaced longitudinally of the conveyor. The latter has, on each side of the chain, an assembly for guiding the transverse bars, and thus the chain to which they are attached, during movement of the chain along the curved path. A first such assembly includes, in combination, a flange or skirt depending from the corresponding end of each bar and a first stationary rail against which the skirt slides for guiding purposes only. A second assembly includes, on the other side of the chain, a roller depending from the other end of each bar and a second stationary rail over which the rollers ride, also for guiding purposes only.

Because the transverse bars overhang the relatively thin chain on each of its sides, the chain tends to wabble particularly as it is also called upon to carry the full weight of the heavy and cumbersome hay bales which render the curved conveyor not too efficient and especially prone to breaking or jamming because of this wabbling effect.

The guiding and carrying structure is also complex and the link chain is likely to become packed, in time, with hay, between the transverse carrying plates which could cause jamming of the chain over the sprocket wheels.

SUMMARY OF THE INVENTION

An object of the present invention is to provide a curved conveyor wherein a central chain, having bale-driving spikes fixed perpendicularly to it, serves solely to move the bales and not to carry them.

Another object of the invention is in the provision of a curved conveyor wherein the driving chain is guided and carried, during its displacement between the ends of the conveyor, by a plastic chain support formed with suitable recesses for housing the chain upper and lower strands so that the strands are protected from being jammed by bale material.

Yet another object of the invention lies in a curved conveyor wherein the bales are carried essentially by elongated members mounted on the conveyor frame on either side of the chain and parallel to it.

More specifically, the invention is a conveyor for transporting bales of hay or the like material and extending along a curve, the conveyor comprising a frame having a bale-receiving end and a bale-discharging end; an endless chain having an upper and a lower strand and extending between the frame ends while following the curve, and chain-carrying means mounted on the frame between the frame ends and including a plastic chain support for carrying the chain during its displacement. This support defines a pair of parallel grooves extending longitudinally between the frame ends, each groove having an opening on the side of the support which faces away from the center of the curve. The grooves are configured and spaced from one another for slidably supporting the chain strands between the frame ends; the chain strands being fitted into the grooves and protruding partly out through the opening. Finally, bale-driving spikes are fixed perpendicularly to the chain, outwardly of the grooves.

Other obects, features and advantages of the invention will become apparent from the description that follows of a preferred embodiment having reference to the appended drawings.

DESCRIPTION OF THE PREFERRED EMBODIMENT

Figure 1:
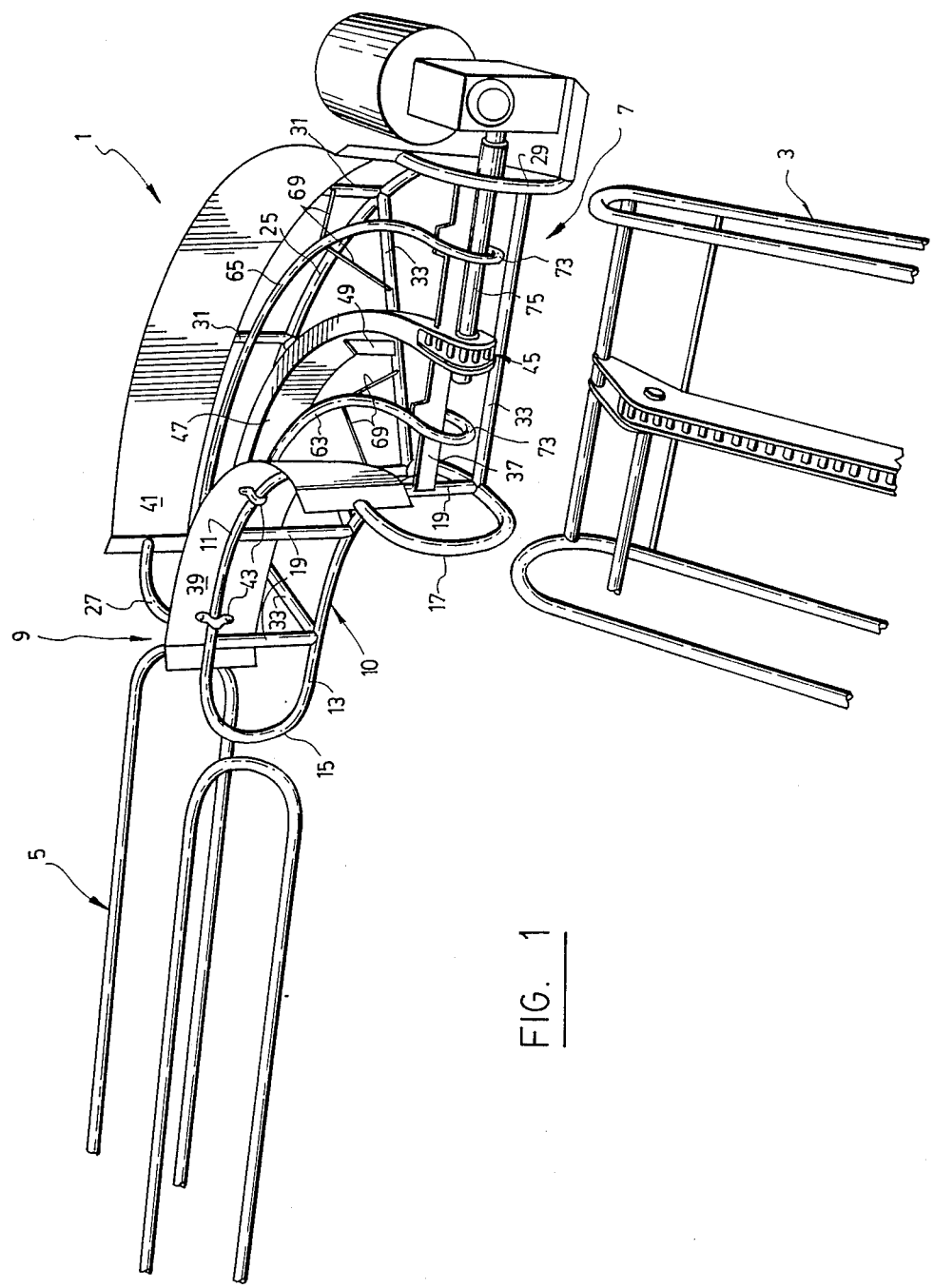
FIG. 1 is a perspective view of a curved conveyor made according to the invention and interconnecting two straight conveyors.

In FIG. 1, the curved conveyor 1, made according to the teaching of the invention, interconnects an upwardly inclined straight conveyor 3 and a horizontal straight conveyor 5 with which they are respectively connected at its bale-receiving end 7 and its bale-discharging end 9. The straight conveyors 3 and 5 make a right angle with one another so that the curved conveyor 1 bends along a 90° curve.

The frame of the conveyor 1 is mostly tubular, having a curved front railing 10 made of an endless round tube defining an upper run 11, a lower run 13 and curved ends 15, 17. Runs 11 and 13 are strengthened by short standards 19. The frame also has a similarly made curved rear railing 21 (FIG. 2) of which the radius of curvature is of course greater than that of the front railing 11. Thus the railing 21 has an upper run 23, a lower run 25 and curved ends 27, 29; the runs being interconnected by short standards 31 (FIG. 1).

Figure 2:
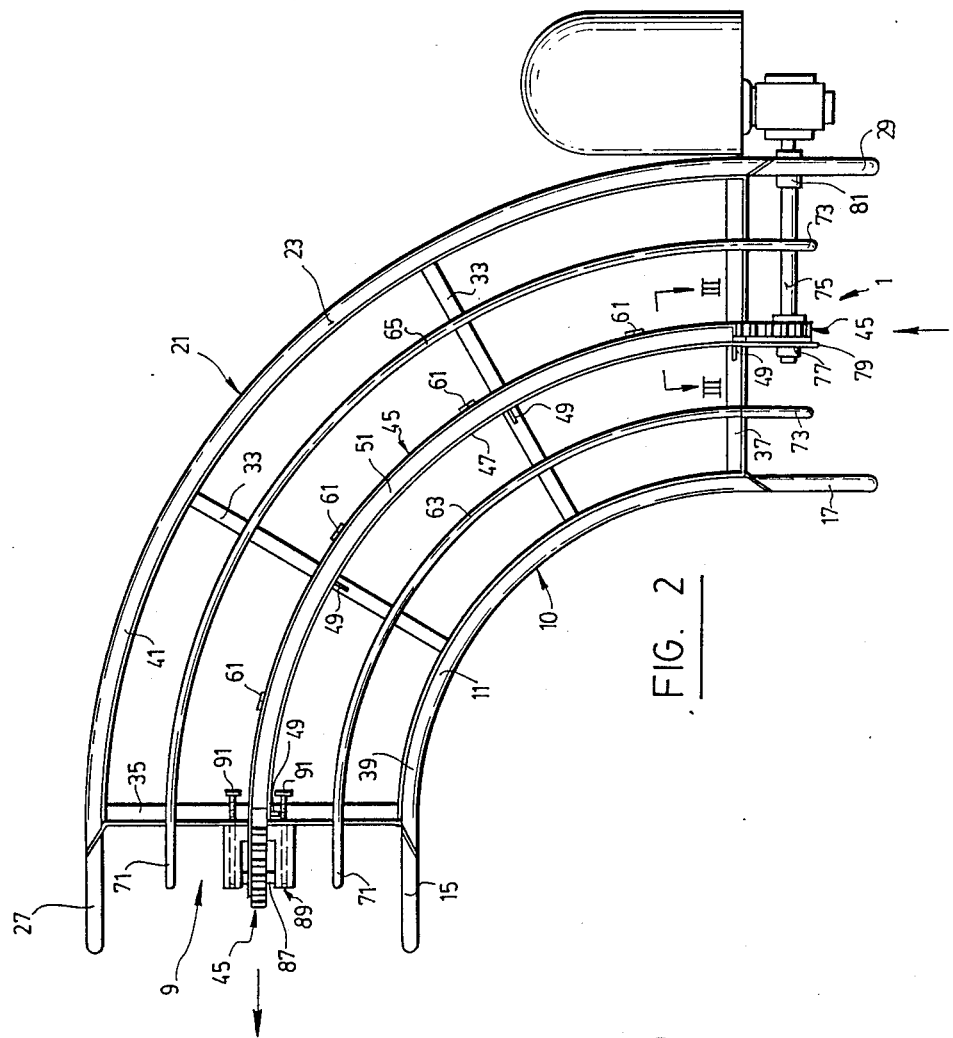
FIG. 2 is a plan view of the same conveyor.

Tubular horizontal transverse struts 33 weldably join the lower runs 13 and 25 of the railings 10 and 21, preferably at the standards 19 and 31 locations as best shown in FIG. 2. The two railings 10 and 21 are also connected together by a pair of angle-irons 35, 37, at the ends 7 and 9 of the conveyor and frame and above the lower runs 13 and 25.

Vertical plates 39 and 41 are provided for guiding bales during their displacement between the conveyor ends 7, 9. They are fixed to the upper runs 11 and 23 of the side railings 10 and 21 by means of U brackets 43 and inwardly of the runs 11, 23.

The chain-carrying means responsible for driving the bales from the receiving end 7 of the frame and conveyor to the discharging end 9 will now be described.

An endless link chain 45 extends between the frame ends 7, 9, and slightly beyond the transverse angle-irons 35, 37, which pass across the chain 45 between the strands 57, 59. The chain is of conventional circular construction that makes it possible to follow the curvature of the conveyor 1. Such chains are made, for instance, by the Cullman Co., being designed to operate on curves.

Inwardly of the chain 45, with respect to the center of the conveyor curve, is a shoulder or backing plate 47, standing edgewise and secured to the transverse angle-irons 35, 37, and to the transverse struts 33 by brackets 49 (FIGS. 1 and 2). This plate is bent to be parallel with the chain 45.

Secured to the outward face of the shoulder plate 47, as by gluing, is a plastic chain support 51, rectangular in cross-section and intended to carry and guide the chain 45 during its displacement between the frame ends 7, 9. The support 51 is detailed in FIG. 3 and extends between the angle-irons 35, 37, but not beyond them (FIG. 2). It defines a pair of parallel generally U-shaped grooves 53, 54, extending longitudinally between the angle-irons 35, 37; each groove having a lateral opening on the side 55 of the support 51 that faces away from the shoulder plate 47. As can be noted from FIG. 3, the grooves 53, 54, are configured and spaced from one another for slidably supporting and retaining the upper and lower strands 57, 59, of the chain between the transverse angle-irons 35, 37. The link chain fits into the grooves while extending partly out through the groove lateral openings. It is inserted in the grooves 53, 54, by uncoupling two adjacent links and sliding the chain into the grooves from the support open ends at the angle-irons 35, 37. After the chain is wound around the sprockets (not shown) at the ends 7 and 9 of the frame, the disconnected ends are again coupled together.

The grooves, as shown, have a narrow section for guiding the connecting pins of the chain and an enlarged section for guiding the pairs of overlapping links on one side of the chain; the overlapping links on the other side, protruding out through the lateral opening of the support 51.

As mentioned previously, the chain 45 serves solely for driving the bales of hay and does not carry them. For this purpose and as particularly illustrated in FIG. 3, a few outer links of the chain are replaced by rectangular spikes 61 that project outwardly perpendicularly from the chain a distance sufficient for them to dig deeply and firmly into the bales and carry them along the conveyor.

Support for the bales during their movement along the conveyor 1 is obtained by a pair of tubular elongated members 63, 65, one on each side of the chain 45 and parallel to it. They are fixed at the frame ends 7, 9, to lugs 67 projecting up from the vertical flange of the angle-irons 35, 37. In between the ends, the support members 63, 65, are secured to the standards 31 and the transverse struts 33 by light braces 69 (FIG. 1). To ease in receiving and discharging bales, the support members 63, 65, may extend beyond the angle-irons 35, 37, and bend down into curved ends 71, 73.

In order to carry the weight of the bales, the support members 63, 65, must of course extend above the chain 45. To assist these members in this regard, the top edge of the shoulder plate 47 is made level with the top of the bale-supporting members 63, 65.

The not shown sprocket wheel carrying the chain 45 at the bale-receiving end 7 is brought into rotation by driving means including a shaft 75 of which one end journals in a bearing assembly 77 carried by an advanced part 79 (FIG. 2) of the shoulder plate 47. The shaft 75 is also carried by a further bearing assembly 81 borne by a standard 31 of the outer railing 21. It is driven by a motor 83 through a speed reducer 85.

Figure 5:
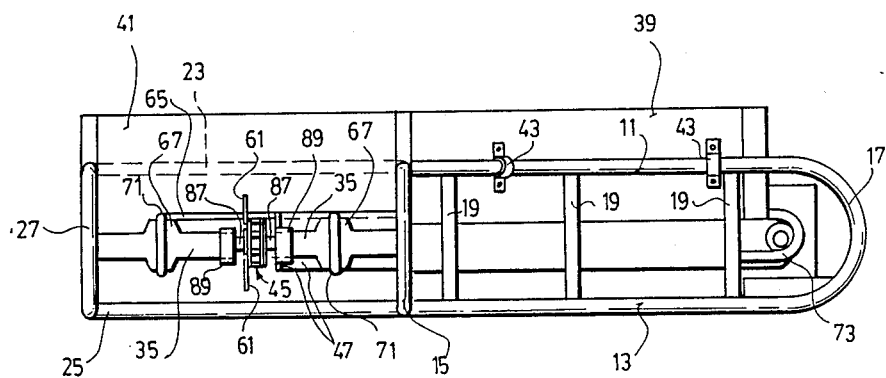

The other not shown sprocket wheel carrying the chain 45 at the bale-discharging end 9 (FIGS. 2, 5), is borne by idler means including a shaft 87 (FIG. 5) operatively coupled to a conventional chain-tightening mechanism 89 adjustable by a pair of screws 91 and secured to the transverse angle-bar 35 in any known manner.

Figure 3:
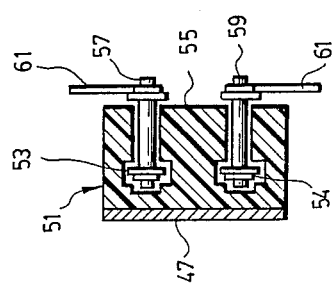
FIG. 3 is a cross-sectional view along line III—III in FIG. 2 intended to illustrate the chain-carrying means.
Figure 4:
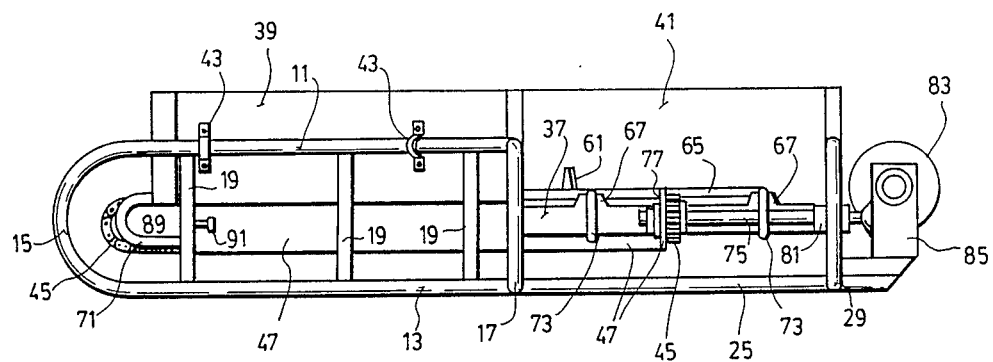
FIG. 4 is an elevation view of the bale-receiving end of the conveyor and FIG. 5 a like view at the bale-discharging end.

The chain support 51, shown particularly in FIG. 3, is preferably an elongated uninterrupted strip of friction-reducing plastic material such as TEFLON or NYLON.

We claim:

1. A conveyor for transporting bales of hay or the like material, said conveyor extending along a curve and comprising:
    a frame having a bale-receiving end and a bale-discharging end;
    and endless chain having an upper and a lower strand, said chain extending between said frame ends and following said curve;
    chain-carrying means mounted on said frame between said frame ends and including a plastic chain support for carrying said chain during displacement thereof; said support defining a pair of parallel grooves extending longitudinally between said frame ends, each groove having an opening on the side of said support facing away from the center of said curve; said grooves being configured and spaced from one another for slidably supporting said chain strands between said frame ends; said chain strands being fitted into said grooves and protruding partly out through said opening, and
    bale-driving spikes fixed perpendicularly to said chain, outwardly of said grooves.

2. A conveyor as claimed in claim 1, wherein said chain-carrying means further comprise an elongated shoulder plate mounted edgewise on said frame between said frame ends; said plastic chain support being secured to said shoulder plate on the face thereof looking outwardly of said curve.

3. A conveyor as claimed in claim 2, additionally comprising a pair of elongated members mounted on said frame between said frame ends, said members being parallel to and spaced from said chain-carrying means, each on one side thereof, for supporting bales being driven by said chain spikes.

4. A conveyor as claimed in claim 3, wherein said plastic chain support has a rectangular cross-section and said grooves are generally U-shaped in cross-section.

5. A conveyor as claimed in claim 3, further comprising vertical guide walls mounted on said frame, parallel to and outwardly spaced from said chain-carrying means for guiding bales being transported by said conveyor.

6. A conveyor as claimed in claim 3, wherein the top edge of said shoulder plate is level with the top of said bale-supporting members.

7. A conveyor as claimed in claim 6, further comprising vertical guide walls mounted on said frame, parallel to and outwardly spaced from said chain-carrying means for guiding bales being transported by said conveyor.

8. A conveyor as claimed in claim 7, wherein said plastic chain support has a rectangular cross-section and said grooves are generally U-shaped in cross-section.

9. A conveyor as claimed in claim 8, further comprising:

sprocket wheel driving means mounted on said frame and operatively connected with said chain at said bale-receiving end, and sprocket wheel idler means mounted on said frame at said bale-discharging end, said idler means being operatively connected with said chain.

10. A conveyor as claimed in claim 9, wherein said idler means comprise a chain-tightening mechanism.

11. A conveyor as claimed in claim 6, wherein said plastic chain support is made of TEFLON.

12. A conveyor as claimed in claim 6, wherein said plastic chain support is made of NYLON.

13. A conveyor as claimed in claim 1, wherein said support is an elongated uninterrupted strip of friction-reducing plastic material.

14. A conveyor as claimed in claim 2, wherein said support is an elongated uninterrupted strip of friction-reducing plastic material.

15. A conveyor as claimed in claim 6, wherein said bale-supporting members are rounded bars.

* * * * *